(12) United States Patent
Watanabe et al.

(10) Patent No.: US 6,221,194 B1
(45) Date of Patent: Apr. 24, 2001

(54) MANUFACTURING METHOD OF ELECTROLUMINESCENT DISPLAY PANEL

(75) Inventors: Yusuke Watanabe, Obu; Shoichi Goto, Nagoya; Kazuhiro Inoguchi, Toyota, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/200,961

(22) Filed: Nov. 30, 1998

(30) Foreign Application Priority Data

Mar. 30, 1998 (JP) .................................................. 10-084430

(51) Int. Cl.[7] .................................................. B32B 31/28
(52) U.S. Cl. ...................................... 156/272.2; 156/306.6
(58) Field of Search ............................... 156/67, 306.6, 156/272.2; 313/505, 506; 315/169.3; 427/66; 445/24, 25

(56) References Cited

U.S. PATENT DOCUMENTS

| | | | |
|---|---|---|---|
| 4,767,679 | * | 8/1988 | Kawachi .............................. 428/690 |
| 4,954,746 | * | 9/1990 | Taniguchi et al. ................... 315/506 |
| 5,194,027 | | 3/1993 | Kruskopf et al. . |
| 5,883,465 | * | 3/1999 | Inoguchi et al. ..................... 313/509 |

* cited by examiner

Primary Examiner—Michael W. Ball
Assistant Examiner—John T. Haran
(74) Attorney, Agent, or Firm—Pillsbury Winthrop LLP

(57) ABSTRACT

Two electroluminescent substrates, each emitting light having different color, are laminated and bonded together with adhesive layer interposed therebetween. An insulation film such as an epoxy film is placed between two substrates and deformed into an adhesive layer under pressure and heat. The adhesive layer serves as a bonding material and a humidity-protection layer as well. Electrical connection between electrodes of the electroluminescent substrates and outside driving circuits is made at the same time two substrates are bonded by the adhesive layer by bonding wiring sheets together. To further improve the humidity-protection ability of the adhesive layer, the surface of the electroluminescent substrates may be covered by resin which is hardened by radiating ultraviolet light at the same time the insulation film is deformed into the adhesive layer. Thus, the electroluminescent display panel having two substrates can be manufactured in a simple and inexpensive manufacturing process.

10 Claims, 8 Drawing Sheets

MANUFACTURING METHOD OF ELECTROLUMINESCENT DISPLAY PANEL

CROSS-REFERENCE TO RELATED APPLICATION

This application is based upon and claims benefit of priority of Japanese Patent Application No. Hei-10-84430 filed on Mar. 30, 1998, the content of which is incorporated herein by reference.

BACKGROUND OF THE INVENTION

1. Field of the Invention

The present invention relates to a manufacturing method of an electroluminescent display panel in which a plate or another electroluminescent substrate is laminated over an electroluminescent substrate.

2. Description of Related Art

An electroluminescent (hereinafter referred to as EL) display panel in which two EL substrates are laminated has been known hitherto. One EL substrate emits light of a certain color, and the other EL substrate emits light of a different color, thereby providing a multi-color or full color display when the two substrates are combined as a single unit. One example of the EL display panel of this kind is disclosed in JP-A-64-60993. Two EL substrates, each comprising a pair of electrode layers and a luminescent layer interposed between the pair of electrodes layers, are laminated over each other with a space therebetween. The periphery of the laminated EL substrates is sealed by epoxy resin or a film carrying a connector wiring thereon, thereby forming a single display panel having a space between the two EL substrates which is sealed at its periphery. The peripherally-sealed spacing, (also, termed "closed space" in some references) is brought under vacuum and filled with insulation oil such as silicone oil to protect an active area (an area from which light is emitted) of the EL panel from moisture. To fill the peripherally-sealed spacing with insulation oil, the spacing has to be brought under vacuum, and then the insulation oil has to be introduced. This requires additional manufacturing steps, and moreover there is a possibility that the insulation oil will leak out of the spacing under an extreme environment.

Also, in a single EL display panel which has only one EL substrate and is covered by a cover plate such as a glass plate, a space between the EL substrate and the cover plate has to be filled with insulation oil in the same manner as in the EL panel having two EL substrates. Therefore, the same aforementioned problems are unavoidable.

SUMMARY OF THE INVENTION

The present invention has been made in view of the above-mentioned problem. An object of the present invention is to provide an effective and efficient method of bonding two EL substrates or bonding an EL substrate and a cover plate. Another object of the present invention is to provide a method of forming a sealing structure to protect the active area of the EL display panel from moisture.

According to the present invention, a first EL substrate having an electroluminescent layer sandwiched between a pair of electrodes and a second EL substrate having the same structure as the first EL substrate are laminated so that both luminescent layers face each other. Both EL substrates are bonded together with an adhesive layer interposed therebetween under pressure and heat. An insulation film made of resin such as epoxy resin is placed between both EL substrates and is deformed into the adhesive layer under pressure and heat. The adhesive layer serves not only to firmly bond both substrates but also to prevent moisture or water from permeating into the bonded EL display panel. The EL display panel having two EL substrates can be manufactured in a simple and inexpensive manufacturing process.

Preferably, two EL substrates, each emitting different color of light are bonded so that a multi-color display is realized. For example, an EL substrate emitting green light is used as the first substrate and an EL substrate emitting orange light is used as the second substrate. A simple cover plate such as a glass plate having no EL elements may be used in place of the second EL substrate. The adhesive layer can serve as a humidity-protection layer as long as it covers at least an active area of the EL display panel, but it is preferable that the humidity-protection layer covers the entire surface of the EL substrates containing the adhesive layer.

A pair of the electrodes of each EL substrate are connected to outside driving circuits through connector sheets having wiring printed thereon. The connector sheets are attached to the insulation film before the insulation film is deformed into the adhesive layer under pressure and heat, and the electrodes are electrically connected to the connector sheets at the same time both EL substrates are bonded by the adhesive layer. The bonding process may be carried out in the following order. The insulation film to which the connector sheets for the first EL substrate are attached is bonded to the first EL substrate. Then, the connector sheets for the second EL substrate are attached to the insulation film, and the second EL substrate is bonded to the first EL substrate with the adhesive layer deformed from the insulation film interposed therebetween. Alternatively, connector sheets for both EL substrates are first attached to the insulation film, and then both EL substrates are bonded with the insulation film interposed therebetween.

The surface of both EL substrates may be covered by resin to be hardened by ultraviolet radiation before the surface is covered by the insulation film, so that the surface is flattened to prevent the enclosure of bubbles between the surface and the adhesive layer. The resin is hardened by radiating ultraviolet light at the same time the insulation film forms the adhesive layer under pressure and heat. Additional use of the resin to be hardened by ultraviolet radiation further improves humidity-protection ability of the EL display panel. As the insulation film, a resin film having tackiness, preferably, an epoxy resin film is used.

Other objects and features of the present invention will become more readily apparent from a better understanding of the preferred embodiments described below with reference to the following drawings.

DETAILED DESCRIPTION OF THE PREFERRED EMBODIMENTS

Figure 1:
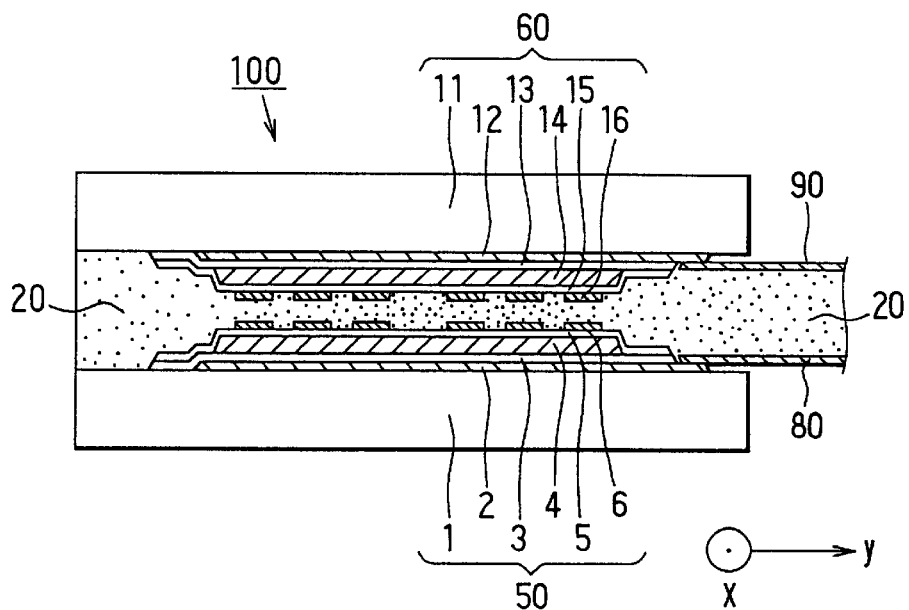
FIG. 1 is a cross-sectional view showing an EL display panel in which two EL substrates are bonded together according to the present invention.

Referring to FIGS. 1–7, a first embodiment of the present invention will be described. The first embodiment shown in FIG. 1 is an EL display panel 100 having a first EL substrate 50 which emits green light and a second EL substrate 60 which emits orange light. Both EL substrates 50 and 60 are laminated and bonded together with an adhesive layer 20 interposed therebetween. A first connector sheet 80 is electrically connected to electrodes of the first EL substrates 50 and bonded by the adhesive layer 20. A second connector sheet 90 is electrically connected to electrodes of the second EL panel 60 and bonded by the adhesive layer 20.

The first EL substrates is composed of a glass substrate 1, lower electrodes 2, a lower insulation layer 3, a luminescent layer 4, an upper insulation layer 5 and upper electrodes 6. All layers and electrodes are laminated on the glass substrate 1 in this order. The lower electrodes 1 are an electrode array having a plurality of electrodes extending in parallel to one another. The upper electrodes 6 have the same structure as the lower electrodes 2, but they extend in a direction perpendicular to the lower electrodes 2, so that both electrodes 2 and 6 form a matrix. Both electrodes 2 and 6 are made of a transparent material such as ITO (indium-tin-oxide), and each of the insulation layers 3 and 5 is a single or double layers made of a material such as $Ta_2O_5$, $TiO_2$, $SiO_2$ or $Si_3N_4$. The luminescent layer 4 is made of (ZnS:Tb, F) which emits green light.

The second EL substrate 60 has the same structure as the first EL substrate 50 and is composed of a glass substrate 11, lower electrodes 12, a lower insulation layer 13, a luminescent layer 14, an upper insulation layer 15 and upper electrodes 16. The luminescent layer 14 of the second EL substrate 60 is made of (ZnS:Mn) which emits orange light.

Figure 2:
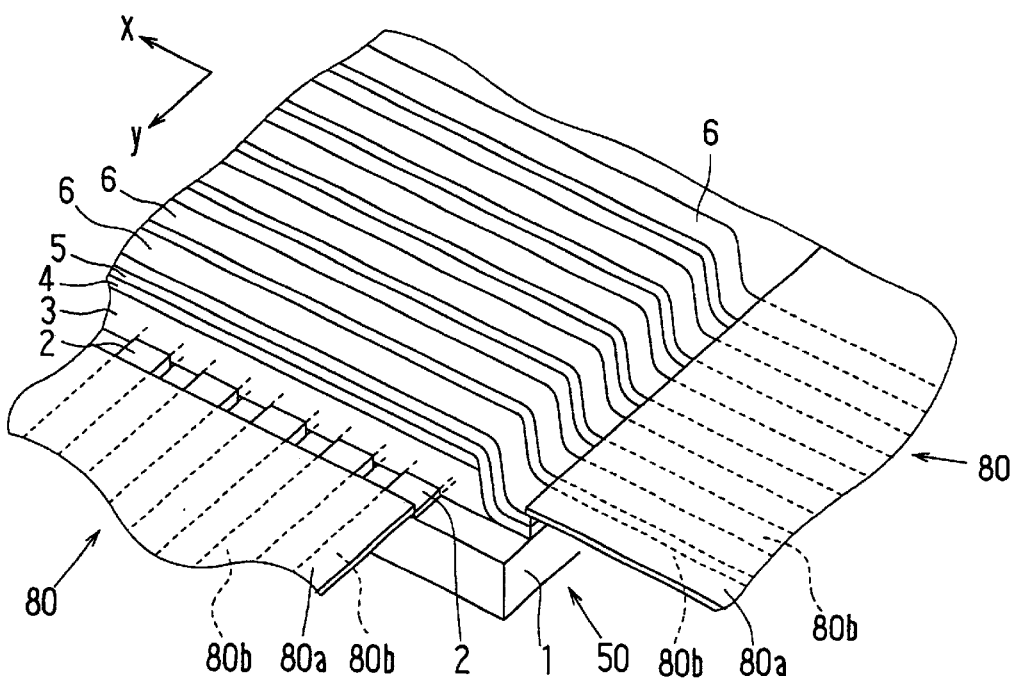
FIG. 2 is a perspective view showing a structure for connecting an EL substrate to connecting sheets having connection wiring thereon.
Figure 3:
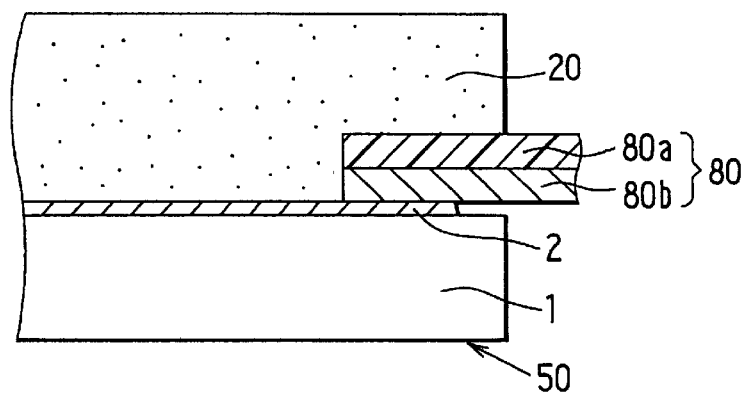
FIG. 3 is a partial cross-sectional view showing details of the connecting structure shown in FIG. 2.

As shown in FIG. 2, the first connector sheet 80 includes two sheets, one connected to the lower electrodes 2 and extending in "y" direction, and the other connected to the upper electrodes 6 and extending in "x" direction. Each sheet of the first connector sheet 80 is composed of a polyimide resin sheet 80a and a copper wiring 80b printed on the polyimide resin sheet 80a. As shown in FIG. 3, the copper wiring 80b is electrically connected to the lower electrodes 2, and the first connector sheet 80 as a whole is held and bonded by the adhesive layer 20. The second connector sheet 90 having the same structure as the first connector sheet 80 is electrically connected to the electrodes 12, 16 of the second EL substrate 60, and bonded by the adhesive layer 20 in the same manner as in the first connector sheet 80. Preferably, portions of the electrodes 2, 6, 12, 16 where the connector sheets 80, 90 electrically contact the electrodes are covered by a conductive layer such as an aluminum-nickel layer, but the electrical contact can be secured without such an additional layer.

As shown in FIG. 1, the second EL substrate 60 is laminated upside-down over the first EL substrate 50 with the adhesive layer 20 interposed therebetween and bonded together by the adhesive layer 20, thereby forming the EL display panel 100. The connector sheets 80, 90 are electrically connected to driver circuits (not shown) which may be disposed on the surface of the EL display panel 100 or separately therefrom.

Figure 4:
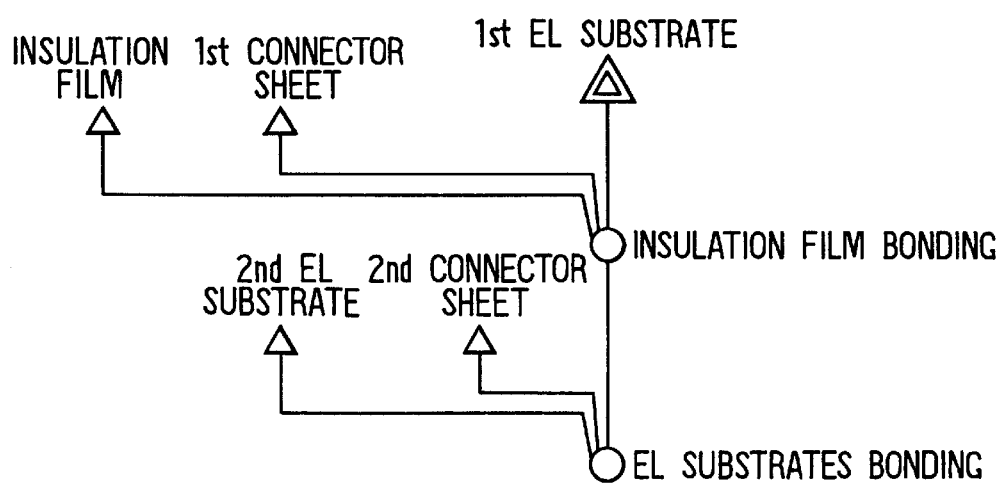
FIG. 4 is a diagram showing manufacturing steps of a first embodiment of the present invention.
Figure 5A:
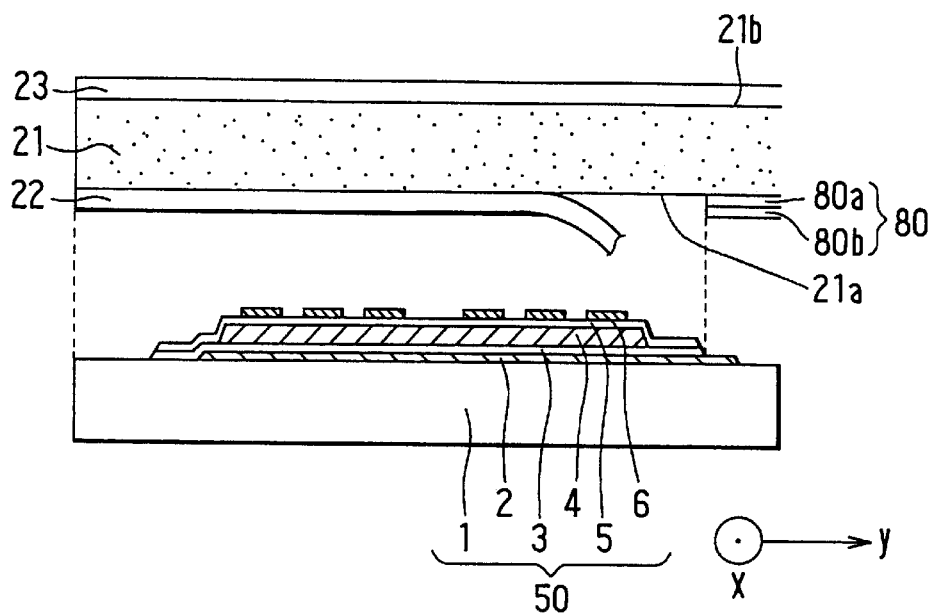
FIGS. 5A, 5B, 6A and 6B are cross-sectional views each showing a respective manufacturing step shown in FIG. 4.
Figure 5B:
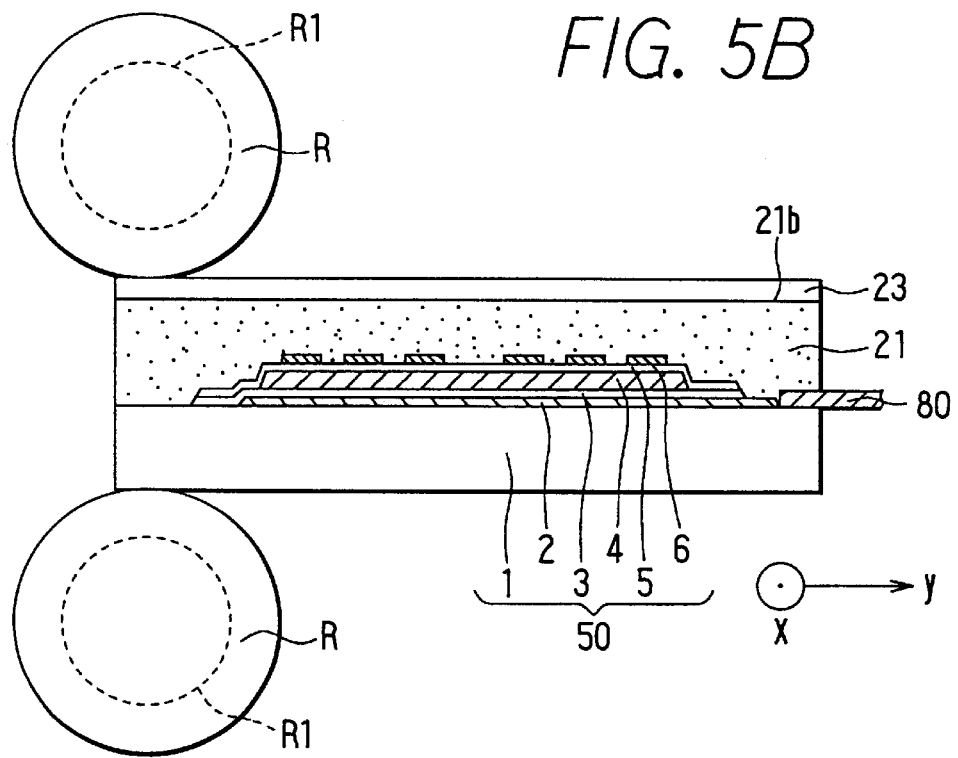

FIG. 4 shows a manufacturing process of the first embodiment described above, and FIGS. 5A, 5B, 6A and 6B show respective steps in the manufacturing process. As shown in FIG. 4, the first EL substrate 50, the first connector sheet 80 and an insulation film 21 which forms the adhesive layer 20 are prepared. Then, these components are bonded together at an insulation film bonding step (FIGS. 5A and 5B). The second EL substrate 60 and the second connector sheet 90 are prepared separately, and both of the EL substrates 50, 60 are bonded together at an EL substrates bonding step (FIGS. 6A and 6B).

The EL substrates 50, 60 are prepared by forming layers and electrodes on the respective glass substrates by using known methods such as sputtering or electron beam vapor deposition. To form the adhesive layer 20 on the first EL substrate 50, an insulation film 21 made of epoxy resin is used. The insulation film 21 is transparent and about 0.5 mm–1.0 mm thick. Both surfaces 21a, 21b of the insulation film 21 are sticky and covered by cover sheets 22, 23 made of Teflon (a trademark of DuPont) or the like. The cover sheets 22, 23 are peeled off when the insulation film 21 is attached to the EL substrates. Such an insulation film is known and available in the market.

As shown in FIG. 5A, a part of the cover sheet 22 is peeled off to stick the polyimide resin sheet 80a of the first connector sheet 80 to the insulation film 21. The first connector sheet 80 is stuck to the insulation film 21, so that one of the first connector sheets 80 to be connected to the lower electrodes 2 extends in "y" direction and the other sheet to be connected to the upper electrodes 6 extends in "x" direction as shown in FIG. 2. Then, the remainder of the cover sheet 22 is peeled off, and the insulation film 21 is placed on the first EL substrate 50, so that one surface 21a of the insulation film 21 sticks the first E1 substrate 50 and the copper wiring 80b contacts the electrodes 2, 6. Then, as shown in FIG. 5B, the insulation film 21 is pressed against the first EL substrate 50 from both sides thereof by two rollers R which are heated by electric heaters R1 disposed therein. In other words, the insulation film 21 is laminated on the EL substrate 50 by pressing it down while heating the same (hot-press-bonding). The bonding pressure given by two rollers R is 1–5 $kg/cm^2$, the surface temperature of the rollers R is 150–250° C., and the traveling speed of the rollers R is 0.5–1.5 m/min. The insulation film 21 is heated to a temperature above a glass-transition temperature and bonded to the first EL substrate 50. The copper wiring 80b is connected to the electrodes 2, 6 at the same time. A jig for the hot-press-bonding is designed so that the portion of the insulation film 21 which is deformed by being pressed is squeezed out over the first connector sheet 80.

Figure 6A:
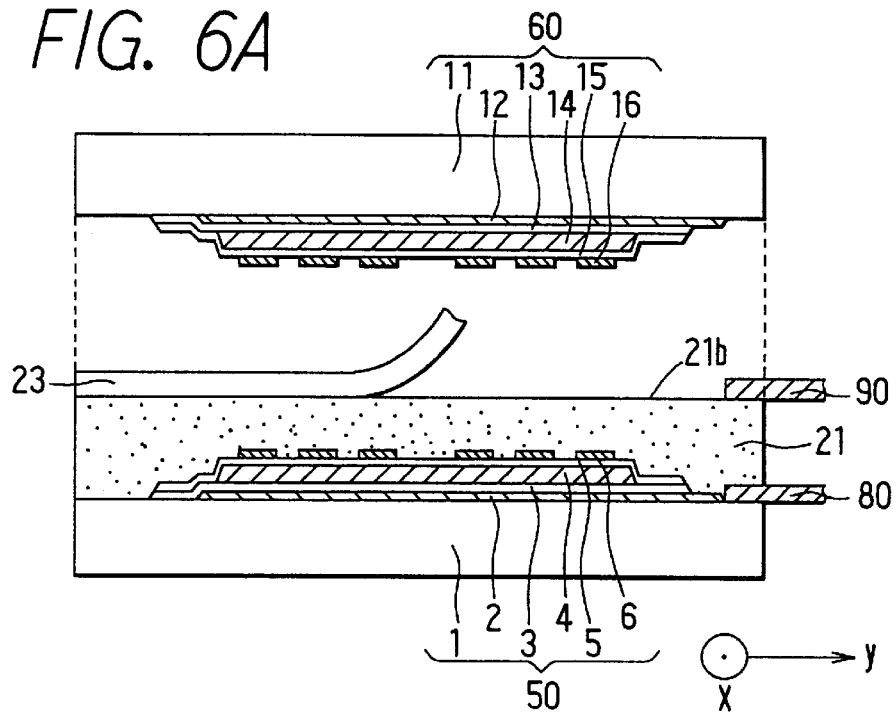
Figure 6B:
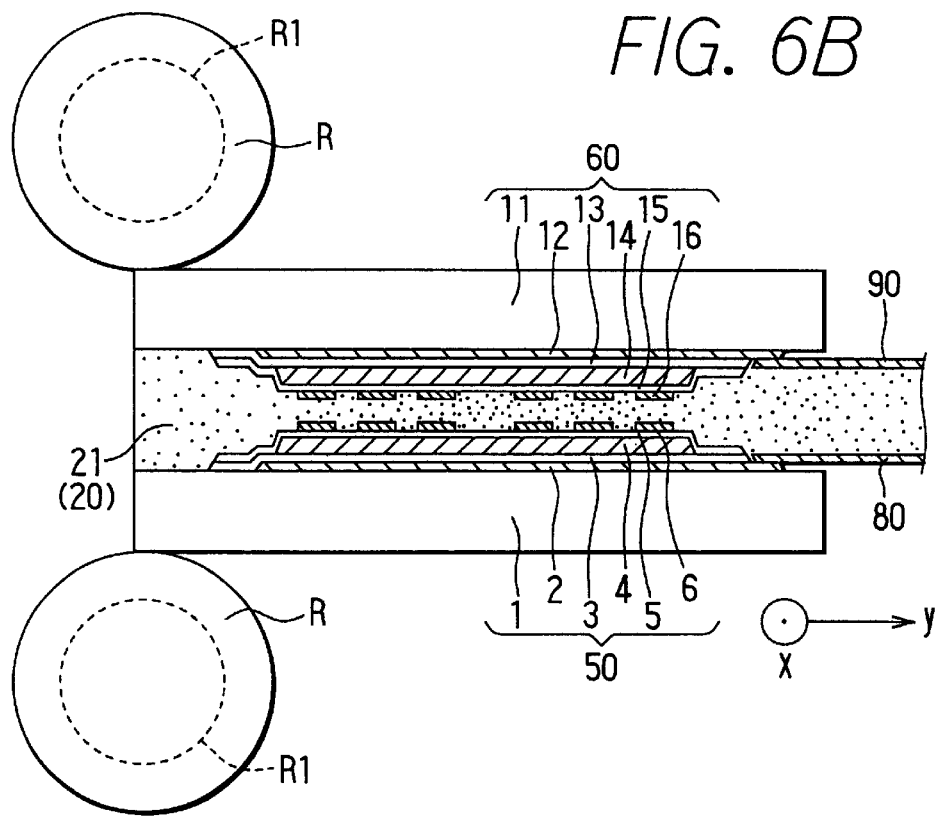
Figure 7:
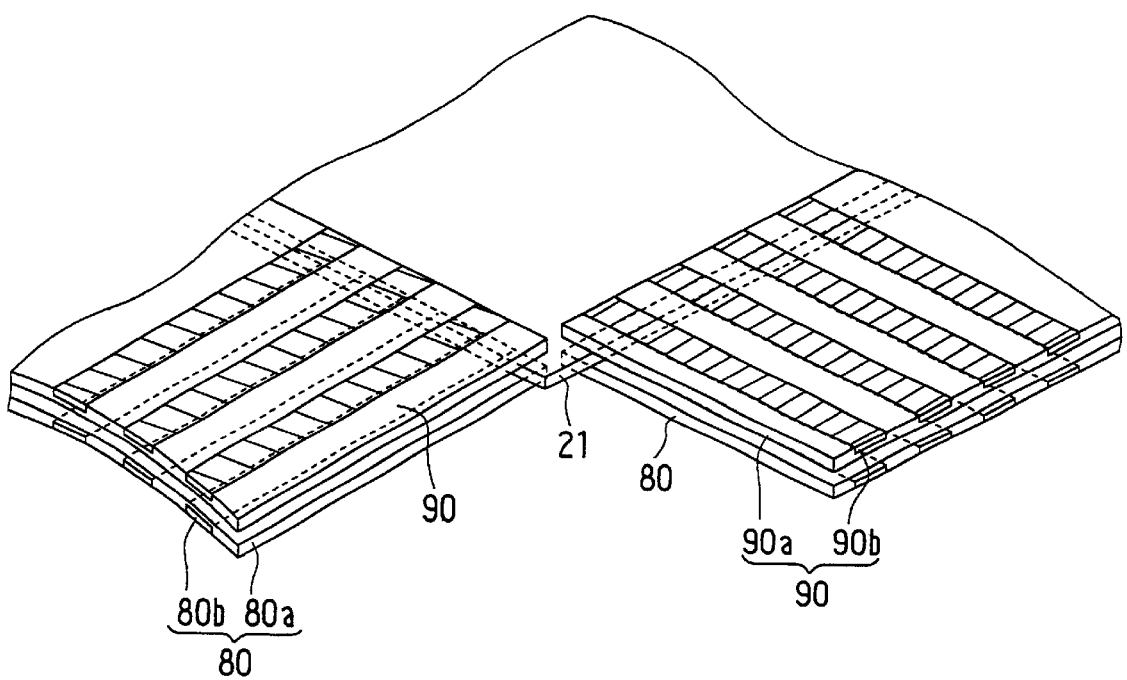
FIG. 7 is a perspective view showing connector sheets connected to an insulation film to be interposed between two EL substrates.

Referring to FIGS. 6A and 6B, a process for bonding two EL substrates 50, 60 will be described. As shown in FIG. 6A, a part of the cover sheet 23 is peeled off to stick the second connector sheet 90 to the other (upper) surface 21b of the insulation film 21. Two sheets of the second connector sheet 90 are attached to the upper surface 21b in the same manner as in the first connector sheet 80. That is, one sheet of the second connector sheet 90 to be connected to the lower electrodes 12 extends in "y" direction and the other sheet to be connected to the upper electrodes 16 extends in "x" direction. At this point, the first and the second connector sheets 80, 90 form the insulation film 21 as shown in FIG. 7 (FIG. 7 shows only the insulation film 21 and the connector sheets 80, 90, omitting the EL substrates). Then, the rest of the cover sheet 23 is removed, and the second EL substrate 60 is laminated upside-down on the upper surface 21b of the insulation film 21, so that the two sheets of the second connector sheet 90 are connected to respective electrodes 12, 16. Then, as shown in FIG. 6B, the laminated EL substrates 50, 60 with the insulation film 21 interposed therebetween are pressed and heated by rollers R from both sides, e.g., from both surfaces of the glass substrates 1, 11, in the same manner and under the same conditions as in the hot-press-bonding step shown in FIG. 5B. Thus, both EL substrates 50, 60 are bonded together with the insulation layer 20 interposed therebetween, and the second connector sheet 90 contact the electrodes 12, 16 of the second EL substrate 60 at the same time. During the bonding process, a portion of the insulation film 21 is squeezed out of the spacing between both connector sheets 80, 90. Thus, the EL display panel 100 shown in FIG. 1 is completed.

The connector sheets 80, 90 are electrically connected to respective driver circuits (not shown). The first EL substrate 50 may be driven independently from the second EL substrate 60, and thereby the EL display panel 100 displays multi-color images.

In the EL display panel 100 described above, there is no need to fill the space between the first and the second EL substrates with insulation oil such as silicone oil, because the adhesive layer 20 formed by hot-pressing the insulation film 21 exists in the space and prevents water or moisture from permeating into the space. Also, the two EL substrates 50, 60 are firmly bonded together by the adhesive layer 20 at the same time. Accordingly, the EL display panel 100 can be manufactured in a simple process and at a low cost.

Referring to FIGS. 8–10B, a second embodiment of the present invention will be described. In this embodiment, resin which is hardened by radiating ultraviolet light (hereinafter referred to as UV resin) is additionally used to eliminate bubbles which may be enclosed between the upper electrodes 6, 16 and the insulation film 21 when the upper electrodes 6, 16 are covered by the insulation film 21. If bubbles exist, the function of the adhesive layer 20 to prevent permeation of water or moisture will be deteriorated. The structure and the manufacturing process of the second embodiment other than additional use of the UV resin are the same as those of the first embodiment.

Figure 8:
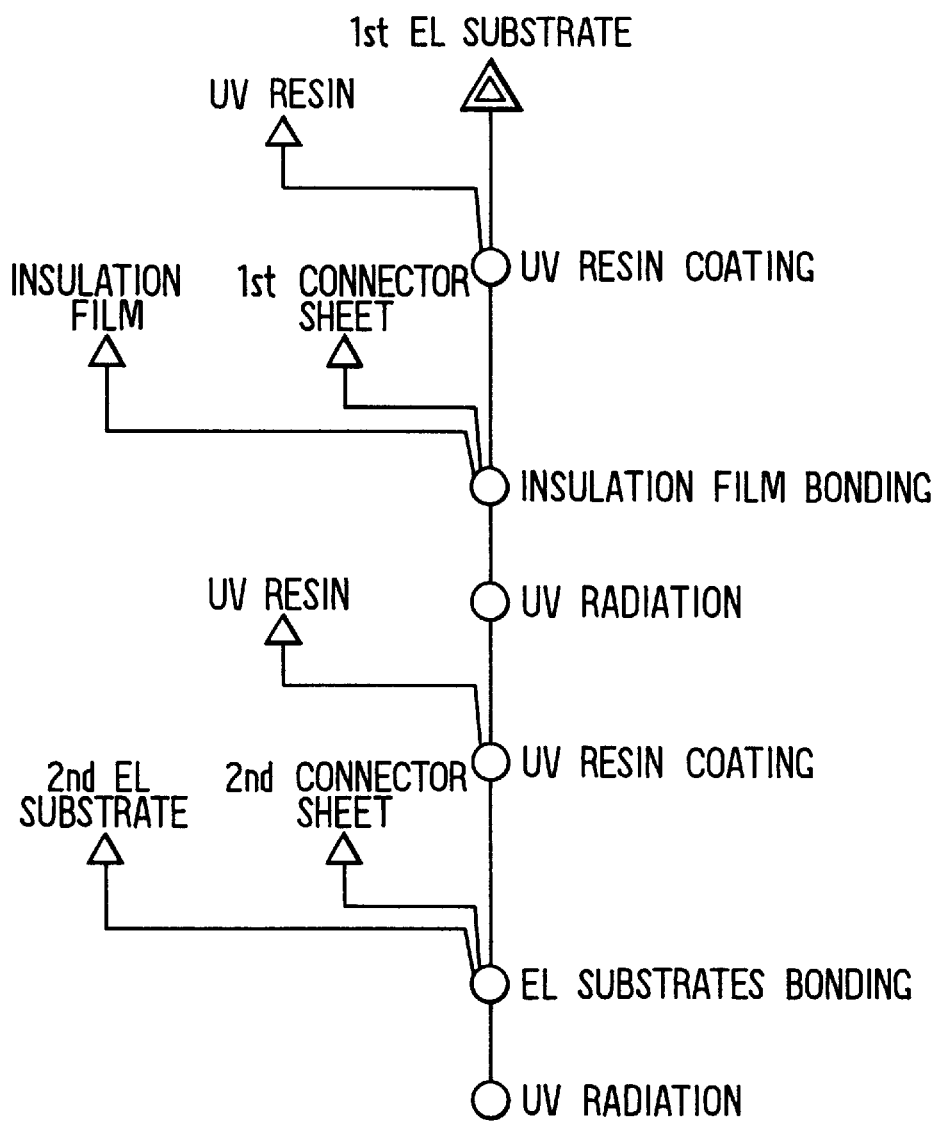
FIG. 8 is a diagram showing manufacturing steps of a second embodiment of the present invention.
Figure 9A:
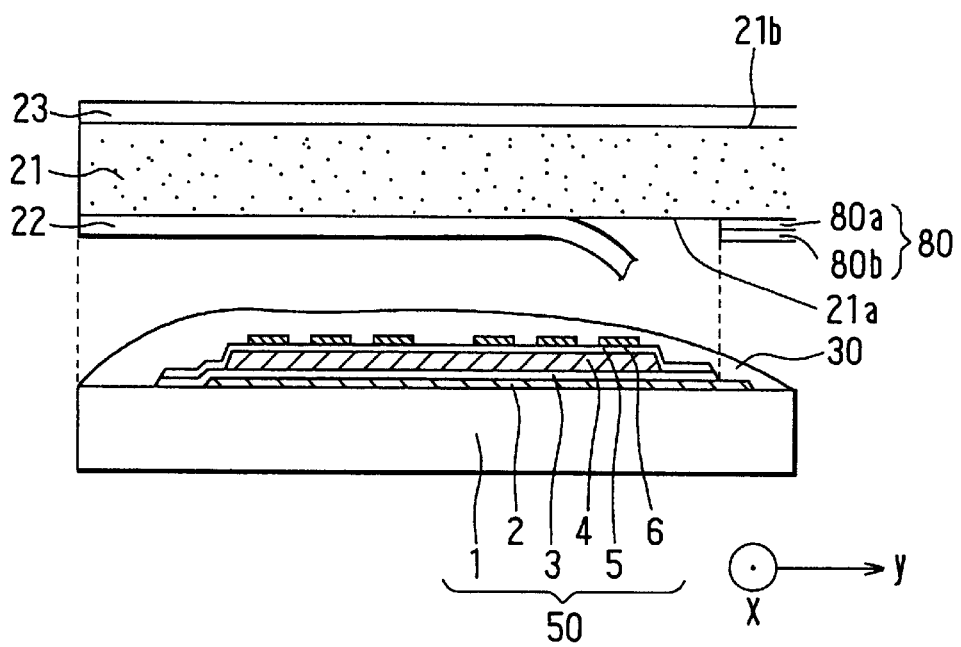
FIGS. 9A, 9B, 10A and 10B are cross-sectional views each showing a respective manufacturing step shown in FIG. 8.
Figure 9B:
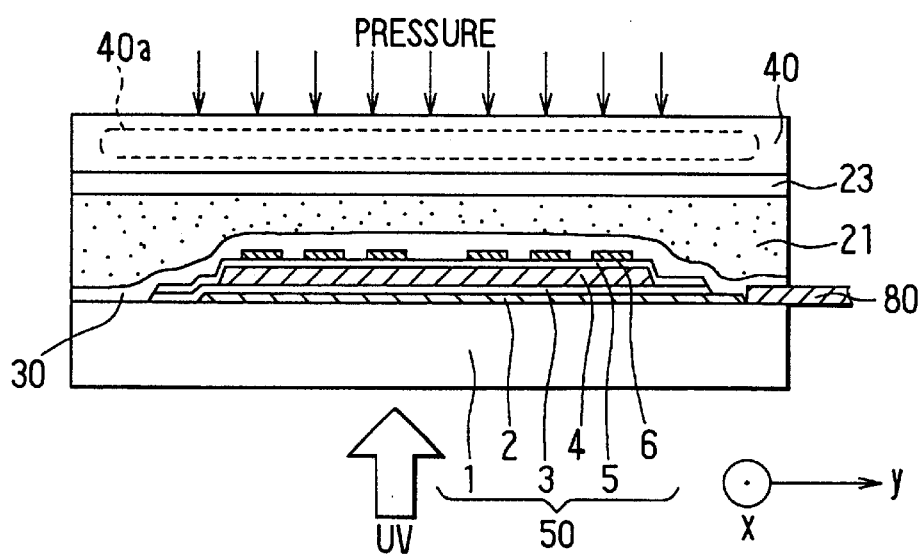
Figure 10A:
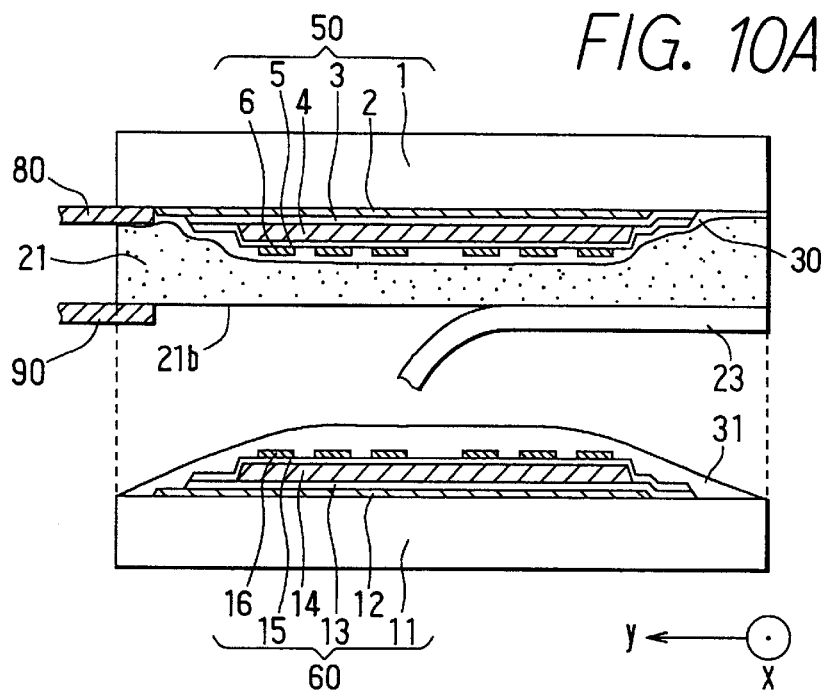
Figure 10B:
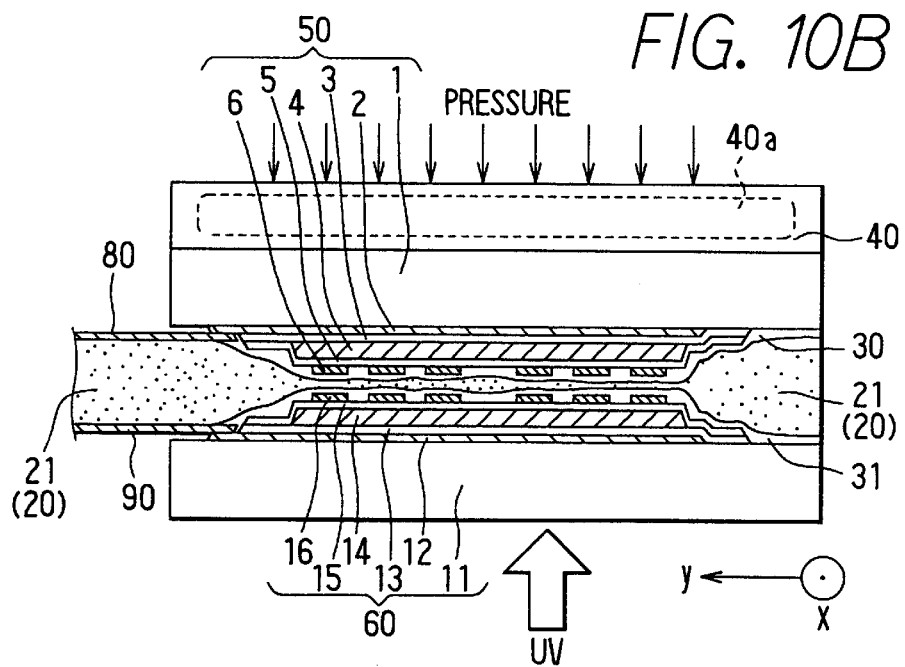

A manufacturing process of the second embodiment is shown in FIG. 8. The first EL substrate 50 and the UV resin 30 are prepared. The UV resin 30 is coated on the first EL substrate 50, and the first connector sheet 80 is attached to the insulation film 21 (FIG. 9A). Then, the insulation film 21 is placed on the UV resin 30 and bonded together under pressure and heat while hardening the UV resin 30 by radiating ultraviolet light (FIG. 9B). UV resin 31 (made of the same material as the UV resin 30) is coated on the second EL substrate 60, and the second connector sheet 90 is attached to the insulation film 21 (FIG. 10A). Then, the first and the second EL substrates 50, 60 are bonded together under pressure and heat while hardening the UV resin 31 by radiating ultraviolet light (FIG. 10B).

Details of the steps of the manufacturing process outlined above will be described, referring to FIGS. 9A, 9B, 10A and 10B. As shown in FIG. 9A, the UV resin 30 is coated on the first EL substrate 50 to cover the whole surface thereof. The cover sheet 22 of the insulation film 21 is partially peeled off, and the polyimide resin sheet 80a of the first connector sheet 80 is attached to the insulation film 21. Then, the rest of the cover sheet 22 are all peeled off and the insulation film 21 is placed on the first EL substrate 50 with the coated UV resin 30 interposed therebetween. As shown in FIG. 9B, the insulation film 21 and the first EL substrate 50 are pressed together by a flat jig 40 which includes an electric heater 40a therein. The pressure imposed by the jig 40 is 1–5 kg/cm², and the surface temperature of the jig 40 is set at 150–250° C. Ultraviolet light is radiated from the side of the glass substrate 1 to harden the UV resin 30 while the pressure is imposed by the jig 40. The energy of UV radiation is 0.1–1.5 J/cm², for example. Small spaces or depressions between the upper electrodes 6 are filled with the UV resin 30, and the surface of the upper electrodes 6 is flattened. Since the small spaces or depressions on the surface of the first EL substrate 50 are eliminated, bubbles are not enclosed between the insulation film 21 and the first EL substrate 50.

As shown in FIG. 10A, UV resin 31 is coated on the second EL substrate 60. The second connector sheet 90 is attached to the other surface 21b of the insulation film 21. Then, the insulation film 21 is placed on the coated UV resin 31 after the cover sheet 23 are all peeled off. As shown in FIG. 10B, the first and the second EL substrates 50, 60 are stacked together and pressed by the jig 40 while applying heat in the same manner and under the same conditions as in the step shown in FIG. 9B. At the same time, ultraviolet light is radiated from the side of the glass substrate 11 to harden the UV resin 31. Thus, spaces or depressions on the surface of the second EL substrate 60 are filled with the UV resin 31, thereby eliminating possible spaces for bubbles between the second EL substrate 60 and the insulation film 21. Since spaces in which bubbles are enclosed are eliminated in the second embodiment, water or moisture is surely prevented from permeating into the EL display panel 100, and thereby a stable and quality display is attained.

The embodiments of the present invention described above may be modified in various forms. For example, the insulation film 21 may be bonded to the second EL substrate 60 and then the first EL substrate 50 may be laminated on the second EL substrate 60 with the insulation film 21 interposed therebetween. Both connection sheets 80, 90 may be first attached to the insulation film 21, forming a sub-assembly as shown in FIG. 7, then the first and the second EL substrates 50, 60 may be bonded together with the sub-assembly interposed therebetween. The connector sheets 80, 90 may be attached to the insulation film 21 so that they extend in directions different from those shown in FIG. 7. That is, for example, one sheet of the first connection sheet 80 to be connected to the lower electrodes 2 and one sheet of the second connection sheet 90 to be connected to the lower electrodes 12 may not be extended in the same direction. Both sheets may extend in respective directions. Though the connection sheets 80, 90 are electrically connected to one end of respective electrodes in the embodiments described above, they may be connected to both ends of the electrodes. The electrodes of the EL substrates may be first connected to outside wiring, and then the first and the second EL substrates may be bonded together with insulation film having no wiring thereon interposed therebetween. As the connection sheets 80, 90, an anisotropic conductive film may be used. It is not necessary to cover a whole surface of the EL substrates with the adhesive layer 20. If the adhesive layer exists at least in the active area of the EL substrates, the purpose to protect the EL substrates from humidity or moisture can be attained.

Further, the present invention may be applied to an EL display panel having only one EL substrate. In this case, the second EL panel 60 described above is replaced by a cover plate such as a glass plate having no EL elements thereon.

Such a cover plate and the first EL substrate 50 are bonded together in the same manner as described. If such a single EL panel is designed so that the light is emitted only from the side of the first EL substrate, the insulation sheet 21 may not be transparent. The insulation sheet 21 may be colored to improve an image contrast.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A manufacturing method of an electroluminescent display panel, the method comprising:
    preparing a first substrate having an electroluminescent layer formed thereon, a second substrate and a transparent insulation film which deforms into an adhesive layer under pressure and heat;
    placing the insulation film between the first and the second substrates;
    bonding the first and the second substrates by applying said heat and pressure to deform said transparent insulation film into an adhesive layer which covers at least an active area of the electroluminescent display panel between said substrates and which alone serves as a moisture proof layer;
    emitting light of a first color from an electroluminescent layer of the first substrate and emitting light of a second color from an electroluminescent layer of the second substrate, wherein said second color is different from said first color;
    coating a surface of the electroluminescent substrate facing the insulation film with resin to be hardened by ultraviolet radiation before the surface is covered by the insulation film; and
    hardening the resin by ultraviolet radiation while the insulation film is being bonded to the electroluminescent substrate.

2. The manufacturing method of an electroluminescent display panel as in claim 1, wherein:
    the electroluminescent layer of the first substrate is sandwiched between a first pair of electrode layers;
    the electroluminescent layer of the second substrate is sandwiched between a second pair of electrode layers; and
    further including fixing electrical connector sheets for connecting both electrodes to outside driving circuits to the insulation film, the fixing being performed before the insulation film placing.

3. A manufacturing method of an electroluminescent display panel having a first and a second electroluminescent substrates, the first electroluminescent substrate including a first luminescent layer which emits light of one color sandwiched between a first pair of electrodes, the second electroluminescent substrate including a second luminescent layer which emits light of another color sandwiched between a second pair of electrodes, both substrates being laminated so that the first and the second luminescent layers face each other with a transparent insulation film interposed therebetween, the method comprising:
    preparing the first and the second luminescent substrates and the insulation film which deforms into an adhesive layer under pressure and heat;
    attaching first connector sheets for electrically connecting the first pair of electrodes to outside driver circuits to a first surface of the insulation film;
    bonding the insulation film on the first electroluminescent substrate under pressure and heat so that the insulation film covers at least an active area of both luminescent layers and the first pair of electrodes are electrically connected to the first connector sheets;
    attaching second connector sheets for electrically connecting the second pair of electrodes to outside driver circuits to a second surface of the insulation film;
    bonding the first and the second electroluminescent substrates by applying pressure and heat to deform said insulation film into an adhesive layer between said substrates and which alone serves as a moisture proof layer, and the second pair of electrodes are electrically connected to the second connector sheets;
    coating a surface of the electroluminescent substrate facing the insulation film with resin to be hardened by ultraviolet radiation before the surface is covered by the insulation film; and
    hardening the resin by ultraviolet radiation while the insulation film is being bonded to the electroluminescent substrate.

4. A manufacturing method of an electroluminescent display panel having a first and a second electroluminescent substrates, the first electroluminescent substrate including a first luminescent layer which emits light of one color sandwiched between a first pair of electrodes, the second electroluminescent substrate including a second luminescent layer which emits light of another color sandwiched between a second pair of electrodes, both substrates being laminated so that the first and the second luminescent layers face each other with a transparent insulation film interposed therebetween, the method comprising:
    preparing the first and the second luminescent substrates and the insulation film;
    attaching first connector sheets for electrically connecting the first pair of electrodes to outside driver circuits to a first surface of the insulation film;
    attaching second connector sheets for electrically connecting the second pair of electrodes to outside driver circuits to a second surface of the insulation film;
    placing the insulation film, to which the first and the second connector sheets are attached, between the first and the second electroluminescent substrates so that the insulation film covers at least an active area of both electroluminescent layers laminated to face each other;
    bonding the first and the second electroluminescent substrates by applying pressure and heat to deform said insulation film into an adhesive layer between said substrates and which alone serves as a moisture proof layer, and both pairs of electrodes are electrically connected to the respective connector sheets;
    coating a surface of the electroluminescent substrate facing the insulation film with resin to be hardened by ultraviolet radiation before the surface is covered by the insulation film; and
    hardening the resin by ultraviolet radiation while the insulation film is being bonded to the electroluminescent substrate.

5. A manufacturing method of an electroluminescent display panel, the method comprising:
    preparing a first substrate having an electroluminescent layer formed thereon, a second substrate and an insulation film;
    placing the insulation film between the first and the second substrates;

bonding the first and the second substrates with an adhesive layer, which is deformed from the insulation film under pressure and heat, interposed between both substrates to cover at least an active area of the electroluminescent display panel;

coating a surface of the electroluminescent substrate facing the insulation film with resin to be hardened by ultraviolet radiation before the surface is covered by the insulation film; and hardening the resin by ultraviolet radiation while the insulation film is being bonded to the electroluminescent substrate.

6. The manufacturing method of an electroluminescent display panel as in claim 5, wherein:

the first substrate has the electroluminescent layer sandwiched between a first pair of electrode layers;

the second substrate has an electroluminescent layer sandwiched between a second pair of electrode layers; and further including fixing electrical connector sheets for connecting both electrodes to outside driving circuits to the insulation film, the fixing being performed before the insulation film placing.

7. A manufacturing method of an electroluminescent display panel having a first and a second electroluminescent substrates, the first electroluminescent substrate including a first luminescent layer which emits light of one color sandwiched between a first pair of electrodes, the second electroluminescent substrate including a second luminescent layer which emits light of another color sandwiched between a second pair of electrodes, both substrates being laminated so that the first and the second luminescent layers face each other with a transparent insulation film interposed therebetween, the method comprising:

preparing the first and the second luminescent substrates and the insulation film;

attaching first connector sheets for electrically connecting the first pair of electrodes to outside driver circuits to a first surface of the insulation film;

bonding the insulation film on the first electroluminescent substrate under pressure and heat so that the insulation film covers at least an active area of both luminescent layers and the first pair of electrodes are electrically connected to the first connector sheets;

attaching second connector sheets for electrically connecting the second pair of electrodes to outside driver circuits to a second surface of the insulation film;

bonding the first and the second electroluminescent substrates under pressure and heat so that both substrates are the insulation film is interposed therebetween and the second pair of electrodes are electrically connected to the second connector sheets;

coating a surface of the electroluminescent substrate facing the insulation film with resin to be hardened by ultraviolet radiation before the surface is covered by the insulation film; and hardening the resin by ultraviolet radiation while the insulation film is being bonded to the electroluminescent substrate.

8. A manufacturing method of an electroluminescent display panel having a first and a second electroluminescent substrates, the first electroluminescent substrate including a first luminescent layer which emits light of one color sandwiched between a first pair of electrodes, the second electroluminescent substrate including a second luminescent layer which emits light of another color sandwiched between a second pair of electrodes, both substrates being laminated so that the first and the second luminescent layers face each other with a transparent insulation film interposed therebetween, the method comprising:

preparing the first and the second luminescent substrates and the insulation film;

attaching first connector sheets for electrically connecting the first pair of electrodes to outside driver circuits to a first surface of the insulation film;

attaching second connector sheets for electrically connecting the second pair of electrodes to outside driver circuits to a second surface of the insulation film;

placing the insulation film, to which the first and the second connector sheets are attached, between the first and the second electroluminescent substrates so that the insulation film covers at least an active area of both electroluminescent layers laminated to face each other;

bonding the first and the second electroluminescent substrates under pressure and heat so that both substrates are bonded together with the insulation film interposed therebetween and both pairs of electrodes are electrically connected to the respective connector sheets coating a surface of the electroluminescent substrate facing the insulation film with resin to be hardened by ultraviolet radiation before the surface is covered by the insulation film; and hardening the resin by ultraviolet radiation while the insulation film is being bonded to the electroluminescent substrate.

9. A manufacturing method of an electroluminescent display panel, the method comprising:

preparing a first substrate having an electroluminescent layer formed thereon, a second substrate and an insulation film which deforms into an adhesive layer under pressure and heat;

placing the insulation film between the first and the second substrates;

bonding the first and the second substrates by applying said heat and pressure to deform said insulation film into an adhesive layer, which covers at least an active area of the electroluminescent display panel between said substrates and which alone serves as a moisture proof layer;

coating a surface of the electroluminescent substrate facing the insulation film with resin to be hardened by ultraviolet radiation before the surface is covered by the insulation film; and hardening the resin by ultraviolet radiation while the insulation film is being bonded to the electroluminescent substrate.

10. The manufacturing method of an electroluminescent display panel as in claim 9, wherein:

the first substrate has the electroluminescent layer sandwiched between a first pair of electrode layers;

the second substrate ha s an electroluminescent layer sandwiched between a second pair of electrode layers; and further including fixing electrical connector sheets for connecting both electrodes to outside driving circuits to the insulation film, the fixing being performed before the insulation film placing.

* * * * *